(12) United States Patent
Corcoran

(10) Patent No.: US 11,222,517 B2
(45) Date of Patent: Jan. 11, 2022

(54) UTILITY SAFETY MONITORING SYSTEM

(71) Applicant: Brian M. Corcoran, Ridgewood, NJ (US)

(72) Inventor: Brian M. Corcoran, Ridgewood, NJ (US)

(*) Notice: Subject to any disclaimer, the term of this patent is extended or adjusted under 35 U.S.C. 154(b) by 0 days.

(21) Appl. No.: 16/811,655

(22) Filed: Mar. 6, 2020

(65) Prior Publication Data

US 2020/0286351 A1  Sep. 10, 2020

Related U.S. Application Data

(60) Provisional application No. 62/815,615, filed on Mar. 8, 2019.

(51) Int. Cl.
| | | |
|---|---|---|
| G08B 23/00 | (2006.01) | |
| G08C 15/06 | (2006.01) | |
| G08B 21/02 | (2006.01) | |
| H04L 12/28 | (2006.01) | |
| H04Q 9/00 | (2006.01) | |

(52) U.S. Cl.
CPC .......... *G08B 21/02* (2013.01); *H04L 12/2823* (2013.01); *H04Q 9/00* (2013.01); *H04L 2012/285* (2013.01)

(58) Field of Classification Search
CPC ............... G08B 21/02; H04L 12/2823; H04L 2012/285; H04Q 9/00; H04Q 2209/60; H04Q 2209/86
USPC ............................................. 340/870.02, 632
See application file for complete search history.

(56) References Cited

U.S. PATENT DOCUMENTS

| | | | |
|---|---|---|---|
| 3,259,357 A | 7/1966 | Sharp | |
| 10,648,584 B2* | 5/2020 | Rogers | F16K 31/54 |
| 2010/0330515 A1* | 12/2010 | Ueki | F23N 5/242 |
| | | | 431/22 |
| 2014/0238493 A1* | 8/2014 | Minato | F16K 17/363 |
| | | | 137/1 |
| 2016/0284193 A1* | 9/2016 | Davis | G01M 3/18 |
| 2019/0055835 A1* | 2/2019 | Brookes | H04Q 9/02 |
| 2020/0011449 A1* | 1/2020 | Jagoda | F15B 19/002 |
| 2020/0064872 A1* | 2/2020 | Peace | G05D 16/2086 |
| 2020/0151976 A1* | 5/2020 | Keohane | G08B 25/008 |

(Continued)

OTHER PUBLICATIONS

Sensors and Switches for Valves and Flow meters, Honeywell, Feb. 2019 (Year: 2019).*

(Continued)

*Primary Examiner* — Tanmay K Shah
(74) *Attorney, Agent, or Firm* — Avant Law Group, LLC

(57) ABSTRACT

A system for utility safety monitoring is disclosed. In an embodiment, the system includes a utility fluid meter coupled with a home or business structure, a local control unit, a home appliance with a failure sensor, a monitoring control center, and one or more shut-off valves. The failure sensor is coupled with an Internet of Things (IOT) platform such as a NodeMCU unit. The failure sensor detects a failure event of the home appliance and sends a notification to the local control unit. The local control unit then shuts down the one or more shut-off valves and sends notifications to a utility company and an owner of the home or business structure. The shut-off valve has a locking mechanism including a diaphragm, a locking component, a magnetic solenoid, and a locking shaft with a locking notch indicating a closed position.

17 Claims, 11 Drawing Sheets

(56) References Cited

U.S. PATENT DOCUMENTS

2020/0182460 A1\* 6/2020 Bentley ............... F24C 15/2021
2020/0284613 A1\* 9/2020 Shiota ................... G01F 15/003

OTHER PUBLICATIONS

ESP8266 WiFi gas sensor (Arduino IDE), Jul. 8, 2017, https://web.archive.org/web/20170708003505/http://iot-playground.com/blog/2-uncategorised/53-esp8266-wifi-gas-sensor-arduino-ide.
International Search Report and Written Opinion received in related application PCT/US2020/021554 dated Jun. 9, 2020.

\* cited by examiner

UTILITY SAFETY MONITORING SYSTEM

CROSS REFERENCE TO RELATED APPLICATIONS

This application claims priority to U.S. provisional application 62/815,615 filed on Mar. 8, 2019, the disclosure of which is incorporated by reference herein in its entirety.

FIELD OF THE DISCLOSURE

The disclosure generally relates to utility safety monitoring. More specifically, the disclosure relates to safety monitoring components and systems to prevent additional gas or fluid delivery to one or more failure areas and a determined perimeter located adjacent to the one or more failure areas.

BACKGROUND

According to the American Gas Association, more than seventy-four million residential, commercial, and industrial users in the United States use natural gas, which meets more than one-fourth of all the energy needs in the United States. However, there is no system in the market for monitoring residential, commercial, and industrial gas usage with the intended purpose of shutting off the gas supply at the local level or grid level to prevent explosions in the event of an equipment failure or a gas leak, which leads to increased deadly and costly explosions. A 2018 explosion in Massachusetts resulted in approximately one hundred and fifty homes destroyed, a death, over fifty people hospitalized, and a billion dollars in property damages.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a gas safety management and monitoring emergency system including a gas meter, a local control unit, a home appliance with a failure sensor, a cloud data center, and a shut-off valve. The failure sensor is coupled with a NodeMCU unit. The gas meter is connected to a utility gas entry and the home appliance by gas lines. The failure sensor is activated to send a failure signal to the local control unit upon detecting a failure event of the home appliance. The local control unit shuts down the shut-off valve and sends a first notification signal to the cloud data center upon receiving the failure signal from the failure sensor. The cloud data center sends a second notification signal to a remote utility company upon receiving the first notification signal sent from the local control unit.

Optionally, the home appliance is a stove, an oven, a boiler, a hot water heater, an electrical appliance, an electrical device, et cetera.

Optionally, the shut-off valve utilizes a locking mechanism including a diaphragm, a locking component, a magnetic solenoid, and a locking shaft with a locking notch indicating a closed position. The magnetic solenoid is actuated to extend the locking shaft and push the diaphragm to block passage of the utility gas when the shut-off valve is in the closed position, the closed position is maintained by fixing the locking component to the locking notch of the locking shaft, and the locking shaft in the closed position is reset to an open position only by a human mechanical action.

Optionally, the failure sensor is a carbon monoxide sensor, a heat sensor, a flood sensor, a gas sensor, a seismic sensor, an electrical surge sensor, a short circuit sensor, et cetera.

Optionally, the NodeMCU unit is an ESP 8266 microchip.

Optionally, the failure signal, the first notification signal, and the second notification signal are sent via Ethernet, Internet, LAN/WLAN, ZigBee, Bluetooth, Wi-Fi, Cellular, Satellite, et cetera.

Optionally, the failure signal, the first notification signal, and the second notification signal are encrypted.

Optionally, the failure event of the home appliance is an equipment failure, a utility gas leak, a temperature outside a normal range, a carbon monoxide leak, a flooding condition, an earthquake, a short circuit, an electrical surge, et cetera.

In other embodiments, the disclosure provides a utility safety monitoring system including a utility fluid meter coupled with a home or business structure, a local control unit, a home appliance with a failure sensor, a monitoring control center, and a shut-off valve. The failure sensor is coupled with a NodeMCU unit. The utility fluid meter is connected to a utility fluid entry and the home appliance by utility fluid lines. The failure sensor is activated to send a failure signal to the local control unit upon detecting a failure event of the home appliance. The local control unit shuts down the shut-off valve and sends a first notification signal to the monitoring control center upon receiving the failure signal from the failure sensor. The monitoring control center sends a second notification signal to a remote utility company and a third notification signal to an owner of the home or business structure upon receiving the first notification signal sent from the local control unit.

Optionally, the home appliance is a stove, an oven, a boiler, a hot water heater, an electrical appliance, an electrical device, et cetera.

Optionally, the shut-off valve utilizes a locking mechanism including a diaphragm, a locking component, a magnetic solenoid, and a locking shaft with a locking notch indicating a closed position. The magnetic solenoid is actuated to extend the locking shaft and push the diaphragm to block passage of the utility fluid when the shut-off valve is in the closed position, the closed position is maintained by fixing the locking component to the locking notch of the locking shaft, and the locking shaft in the closed position is reset to an open position only by a human mechanical action.

Optionally, the failure sensor is a carbon monoxide sensor, a heat sensor, a flood sensor, a gas sensor, a seismic sensor, an electrical surge sensor, a short circuit sensor, et cetera.

Optionally, the NodeMCU unit is an ESP 8266 microchip.

Optionally, the failure signal, the first notification signal, and the second notification signal are sent via Ethernet, Internet, LAN/WLAN, ZigBee, Bluetooth, Wi-Fi, Cellular, Satellite, et cetera.

Optionally, the failure event of the home appliance is an equipment failure, a utility gas leak, a temperature outside a normal range, a carbon monoxide leak, a flooding condition, an earthquake, a short circuit, an electrical surge, et cetera.

In further embodiments, the disclosure provides a utility safety monitoring system including a utility meter coupled with a home or business structure, a local control unit, a failure sensor, a monitoring control center, and a shut-off. The failure sensor is coupled with a NodeMCU unit. The utility meter is connected to a source by a supply line. The failure sensor is activated to send a failure signal to the local control unit upon detecting a failure event. The local control unit shuts down the shut-off and sends a first notification signal to the monitoring control center upon receiving the failure signal from the failure sensor. The monitoring control center sends a second notification signal to a remote utility company and a third notification signal to an owner of the home or business structure upon receiving the first notification signal sent from the local control unit. The shut-off is reversible to an open position from a closed position only by a local action.

BRIEF DESCRIPTION OF THE DRAWINGS

Illustrative embodiments of the disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Natural Gas Monitoring Emergency System (NGMES)

In some embodiments, the disclosure provides an NGMES which may include one or more hardware components such as natural gas sensors, temperature sensors, local control units (LCU), Internet of Things (IOT) platform devices (e.g., a NodeMCU unit such as an ESP 8266 microchip), valve control devices (e.g., a gas meter shut-off valve), backup battery power supply devices, firewall devices, Wi-Fi devices, and wireless/wired communication devices. Each of the natural gas sensors, temperature sensors, and valve control devices may be equipped with its own or shared IOT platform device. Alternatively, the NGMES may further include one or more components such as secure cloud data centers (CDC), utility company monitoring stations, utility technician devices, homeowner devices, et cetera. Part or all of the hardware components may be connected via Ethernet, Internet, LAN/WLAN, ZigBee, Bluetooth, Wi-Fi, Cellular, Satellite, or other applicable means. The NGMES may further include one or more software components such as NGMES Cloud Based interface, software, mobile app, or Software as a Service (SAS); utility company monitoring & management interface, software, mobile app, or Software as a Service (SAS); utility company personnel monitoring & notifications interface, software, mobile app, or Software as a Service (SAS); and home/business owners interface, software, mobile app, or Software as a Service (SAS). The NGMES may implement security protocols/methods in both internal and external communications such as encryption, Ethernet/Internet/LAN/WLAN/ZigBee/Bluetooth/Wi-Fi/Cellular/Satellite redundancy, Blockchain, or other centralized/decentralized protocols.

Figure 1:
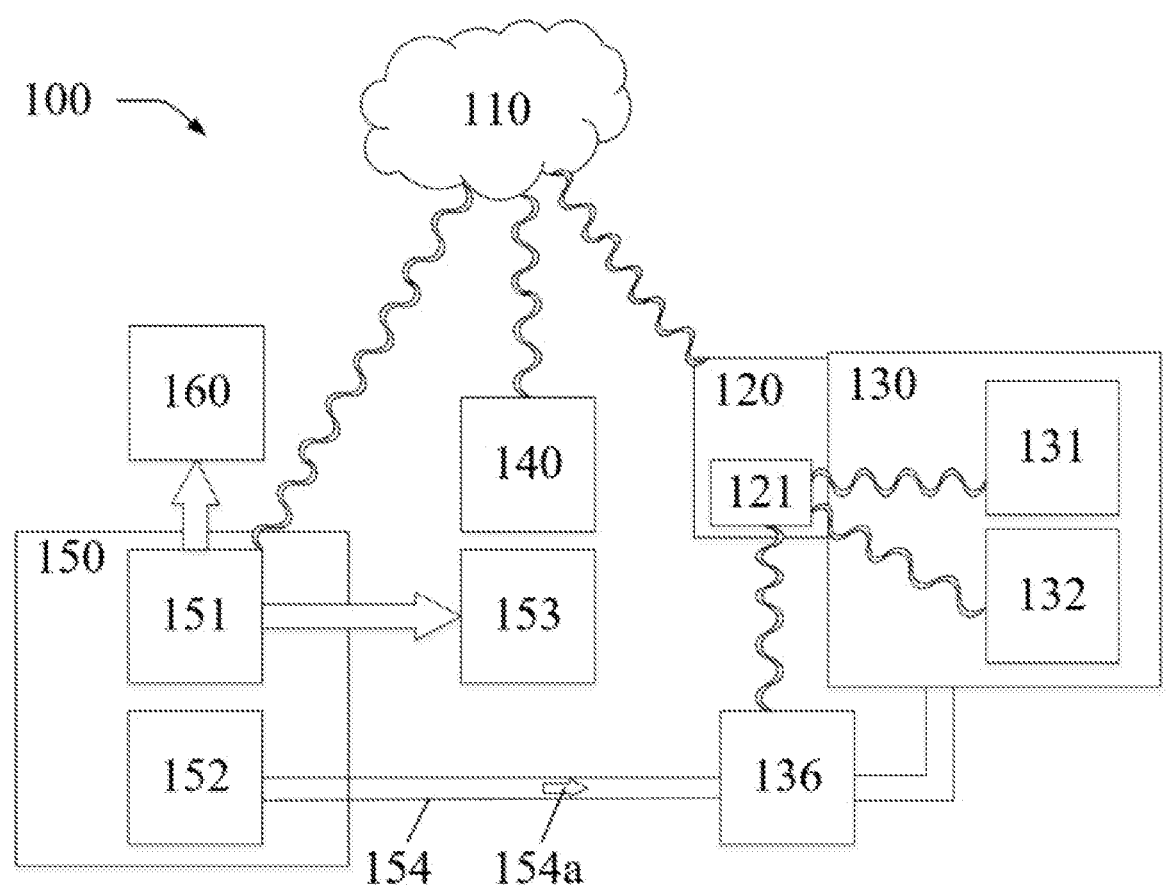
FIG. 1 is a diagram of a natural gas monitoring emergency system (NGMES) according to an embodiment of the disclosure.

FIG. 1 shows a natural gas monitoring emergency system (NGMES) 100 according to an embodiment of the disclosure. As shown in FIG. 1, a Local Control Unit (LCU) 120 may include a Wi-Fi component 121, and may be installed inside, outside, or proximate to a home/business structure 130 or a gas meter. The LCU 120 may monitor an NGMES hardware component for a normal or dangerous gas/temperature level by using the heat sensors 131 and the gas sensors 132. The LCU 120 may further monitor an operational system status, a connectivity status, electronic hardware status, electricity delivery status, et cetera. While the heat sensors 131 and the gas sensors 132 in FIG. 1 are connected to the Wi-Fi component 121 of the LCU 120, a person of ordinary skilled in the art would understand that this embodiment only shows a non-limiting wireless configuration of connection; in other connection configurations, the heat sensors 131 and the gas sensors 132 may be wired or wirelessly to one or more components of the LCU 120.

In some embodiments, in the event of a temperature or gas breach, the heat sensor 131 or the gas senor 132 detects a potentially dangerous temperature or concentration level, and instantly notifies the LCU 120. Upon receiving the notification, the LCU 120 immediately initiates a command to a gas meter shut-off valve 136 to partially or fully terminate gas flow 154a coming into the structure 130 from natural gas source 152 by gas line 154, thus preventing an explosion. At the same time, the LCU 120 sends a notification to a remote or on-site secure cloud data center (CDC) 110 via Ethernet, Internet, LAN/WLAN, ZigBee, Bluetooth, Wi-Fi, Cellular, Satellite, or other applicable means. After receiving the notification from the LCU 120, the CDC 110 instantly notifies utility company monitoring stations 151 and/or sends a notification (e.g., SMS message) to a home/business owner 140. This way, the CDC 110 notifies both parties of the event—the utility company 150 and the owner 140. Upon receiving the notification, the utility company 150 may further notify a utility technician 153 associated with the affected area and/or emergency services (police, fire, medical, et cetera) 160 according to preset safety protocols. The process may be carried out automatically with or without human intervention, and may occur within seconds of any dangerous gas, run-away boiler, flooding event, et cetera.

For example, in the event of a gas leak without an explosion, the utility technician 153 associated with the affected area may be dispatched to fix the leak, and emergency services 160 may be notified without being requested. At the same time, the gas line 154 remains shut down until the dispatched technician 153 and/or the remote utility company 150 determine that the system is safe and reset the shut-off valve 136 according to utility company policies. While in some embodiments, the shut-off valve 136 may be reset remotely (e.g., by the utility company 150), it may be patentably desirable for the shut-off valve 136 to have to be reset manually on site. In the event of a leak with an explosion, the utility technician 153 may be dispatched to the affected area and emergency services 160 may be notified and requested.

In other embodiments, the heat sensors 131 and/or the gas sensors 132 may have more than one level of notifications. For example, the sensors 131 and 132 may have two levels of notification. The first level notification may be a warning notification, which may correspond to a gas or temperature breach outside a normal range but not severe enough to trigger a dangerous event such as an explosion. The first level notification may require the utility technician 153 to be dispatched without notifying and/or requiring emergency services 160. The second level notification may be a shut-off notification, which may correspond to a gas or temperature breach outside a normal range and severe enough to trigger a dangerous event such as an explosion. The second level notification may require both the utility technician 153 and emergency services 160 to be dispatched.

In further embodiments, the heat sensors 131 and/or the gas sensors 132 may have three or more levels of notifications. For example, the sensors may have three levels of notification. The first level notification may be a normal notification, which may correspond to a gas or temperature within a normal working. The first level notification may not require the utility technician 153 to be dispatched or emergency services 160. The second level notification may be a warning notification, which may correspond to a gas or temperature breach outside a normal range but not severe enough to trigger a dangerous event such as an explosion. The second level notification may require the utility technician 153 to be dispatched without notifying and/or requiring emergency services 160. The third level notification may be a shut-off notification, which may correspond to a gas or temperature breach outside a normal range and severe enough to trigger a dangerous event such as an explosion. The third level notification may require both the utility technician 153 and emergency services 160 to be dispatched. It is to be understood that more levels of notifications may be implemented by the LCU 120.

Figure 2:
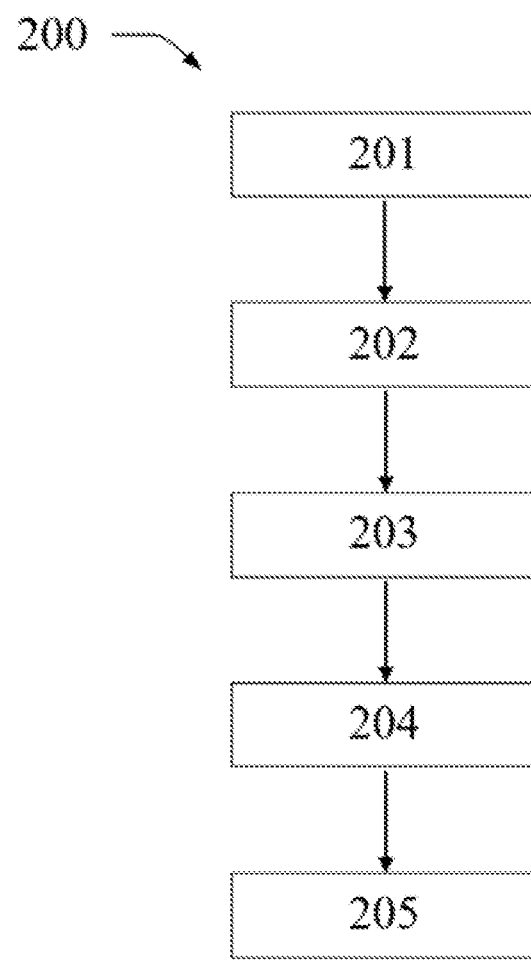
FIG. 2 is a flow chart illustrating a method of implementing an NGMES of FIG. 1, according to an embodiment of the disclosure.

FIG. 2 illustrates a method 200 for implementing the NGMES 100. In step 201, the heat sensor 131 or the gas sensor 132 detects a failure and is then activated by the detected failure. Such failure may be a temperature or concentration breach outside a normal range. In the following step 202, the activated sensor 131 or 132 may send a failure signal to the LCU 120. Next in step 203, the LCU 120 instructs a gas meter to shut off one or more of the shut-off valves 136, thus preventing additional gas or other utility fluids delivery to one or more failure areas or a determined perimeter located adjacent to the one or more failure areas in the structure 130 from the gas or fluid line 154 and/or the source 152. At the same time, the LCU 120 may further send a notification to a remote or on-site CDC 110. Then in step 204, upon receiving the notification from the LCU 120, the CDC 110 may be configured to immediately send a notification signal (e.g., via Ethernet, Internet, LAN/WLAN, ZigBee, Bluetooth, Wi-Fi, Cellular, Satellite, or other applicable means) to the utility company monitoring stations 151 and/or the home/business owner 140. Finally, in step 205, based on the received notification from the CDC 110 and preset safety protocols, the utility technician 153 may be dispatched and/or the emergency services 160 may be notified.

Gas Safety Management and Monitoring Emergency System (GSMMES)

In some embodiments, the disclosure further provides a GSMMES which may include one or more hardware components such as natural gas sensors, temperature sensors, carbon monoxide sensor, flood sensors, seismic sensors, shut-off valves, proportional valves, smart valves, smart electricity meters, smoke sensors, local control units (LCU), Internet of Things (IOT) platform devices (e.g., a NodeMCU unit such as an ESP 8266 unit), valve control devices (e.g., a gas meter shut-off valve), backup battery power supply devices, firewall devices, Wi-Fi devices, and wireless/wired communication devices. Each of the natural gas sensors, temperature sensors, carbon monoxide sensor, flood sensors, seismic sensors, shut-off valves, proportional valves, smart valves, smart valves, smart electricity meters, smoke sensors, and valve control devices may be equipped with its own or shared IOT platform device. Alternatively, the GSMMES may further include one or more components such as secure cloud data centers, utility company monitoring stations, utility technician devices, homeowner devices, et cetera. Part or all of the hardware components may be connected via Ethernet, Internet, LAN/WLAN, ZigBee, Bluetooth, Wi-Fi, Cellular, Satellite, or other applicable means.

The GSMMES may further include one or more software components such as GSMMES Cloud Based interface, software, mobile app, or Software as a Service (SAS); utility company monitoring & management interface, software, mobile app, or Software as a Service (SAS); utility company personnel monitoring & notifications interface, software, mobile app, or Software as a Service (SAS); and home/business owners interface, software, mobile app, or Software as a Service (SAS). The GSMMES may implement security protocols/methods in both internal and external communications such as encryption, Ethernet/Internet/LAN/WLAN/ZigBee/Bluetooth/Wi-Fi/Cellular/Satellite redundancy, Blockchain, or other centralized/decentralized protocols.

Figure 3:
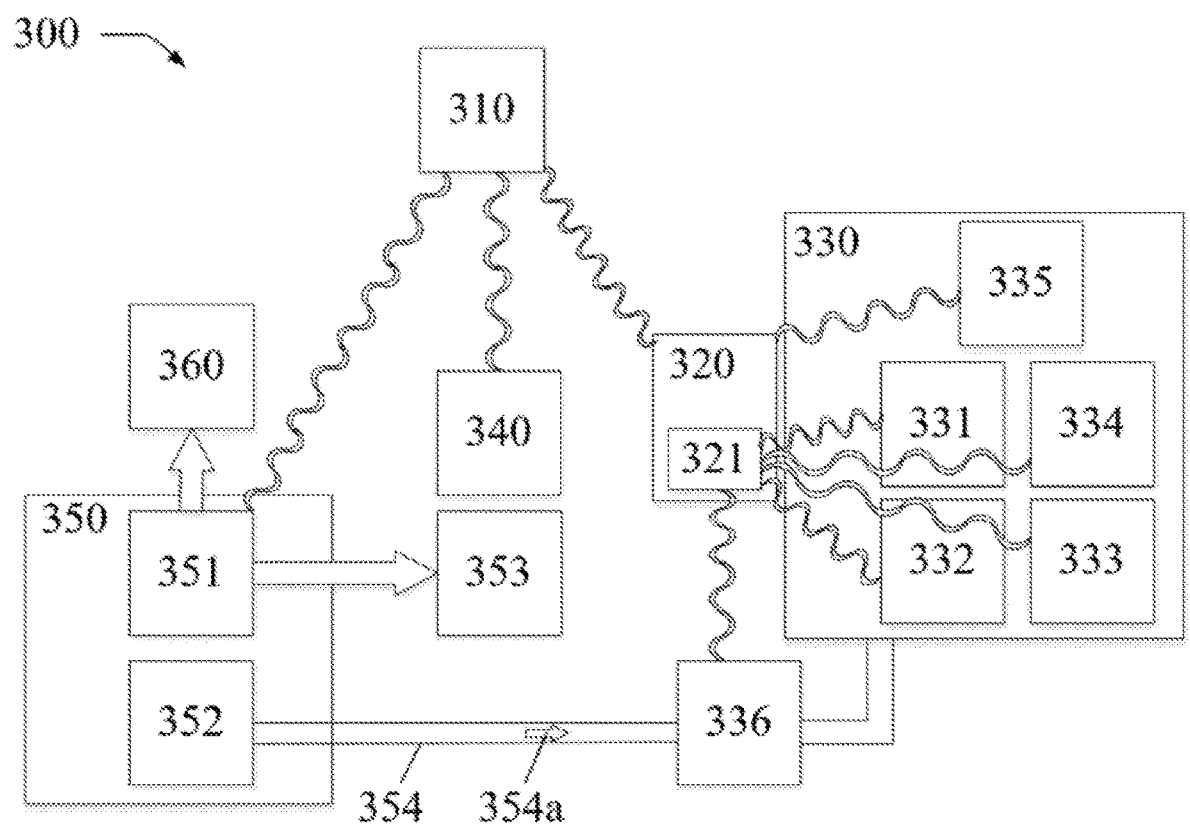
FIG. 3 is a diagram of a gas safety management and monitoring emergency system (GSMMES) according to an embodiment of the disclosure.

FIG. 3 shows a gas safety management and monitoring emergency system (GSMMES) 300 according to an embodiment of the disclosure. As shown in FIG. 3, a Local Control Unit (LCU) 320 may include a Wi-Fi component 321, and may be installed inside, outside, or proximate to a home/business structure 330 or a gas meter. The LCU 320 may monitor a GSMMES hardware component for a normal or dangerous parameter level by using heat sensors 331, gas sensors 332, flood sensors 332, seismic sensors 334, and carbon monoxide sensors 335. The LCU 320 may further monitor an operational system status, a connectivity status, electronic hardware status, electricity delivery status, et cetera. While FIG. 3 shows that the heat sensors 331, the gas sensors 332, the flood sensors 333, and the seismic sensors 334 are connected to the Wi-Fi component 321 of the LCU 320 while carbon monoxide sensors 335 are connected to the LCU 320 directly, a person of ordinary skilled in the art would understand that this embodiment only shows a non-limiting configuration of connection; in other connection configurations, one or more of the heat sensors 331, the gas sensors 332, the flood sensors 333, the seismic sensors 334, and the carbon monoxide sensors 335 may be wired or wirelessly connected to one or more components of the LCU 320.

In some embodiments, the heat sensor 331, the gas sensor 332, the flood sensor 333, the seismic sensor 334, or the carbon monoxide sensor 335 detects a dangerous event such as an abnormal temperature, a natural gas leak, a flood, an earthquake, or a carbon monoxide leak, and instantly notifies the LCU 320. Upon receiving the notification, the LCU 320 immediately initiates a command to a gas meter shut-off valve 336 to partially or fully terminate gas flow 354a coming into the structure 330 from natural gas source 352 by gas line 354. At the same time, the LCU 320 sends a notification to a remote or on-site data center 310 via Ethernet, Internet, LAN/WLAN, ZigBee, Bluetooth, Wi-Fi, Cellular, Satellite, or other applicable means. After receiving the notification from the LCU 320, the data center 310 instantly notifies utility company monitoring stations 351 and/or sends a notification (e.g., SMS message) to a home/business owner 340. This way, the data center 310 notifies both parties of the event—the utility company 350 and the owner 340. Upon receiving the notification, the utility company 350 may further notify a utility technician 353 associated with the affected area and/or emergency services (police, fire, medical, et cetera) 360 according to preset safety protocols. The process may be carried out automatically with or without human intervention, and may occur within seconds of any dangerous natural gas leak, run-away boiler, flooding event, earthquake, carbon monoxide leak, et cetera.

For example, in the event of a gas leak without an explosion, the utility technician 353 associated with the affected area may be dispatched to fix the leak, and emergency services 360 may be notified without being requested. At the same time, the gas line 354 remains shut down until the dispatched technician 353 and/or the remote utility company 350 determine that the system is safe and reset the shut-off valve 336 according to utility company policies. While in some embodiments, the shut-off valve 336 may be reset remotely (e.g., by the utility company 350), it may be patentably desirable for the shut-off valve 336 to have to be reset manually on site. In the event of a leak with an explosion, the utility technician 353 may be dispatched to the affected area and emergency services 360 may be notified and requested.

In other embodiments, the heat sensors 331, the gas sensors 332, the flood sensors 332, the seismic sensors 334, or the carbon monoxide sensors 335 may have more than one level of notifications. For example, the sensors may have two levels of notification. The first level notification may be a warning notification, which may correspond to a safety breach not severe enough to trigger a dangerous event such as an explosion. The first level notification may require the utility technician 353 to be dispatched without notifying and/or requiring emergency services 360. The second level notification may be a shut-off notification, which may correspond to a safety breach severe enough to trigger a dangerous event such as an explosion. The second level notification may require both the utility technician 353 and emergency services 360 to be dispatched.

In further embodiments, the heat sensors 331, the gas sensors 332, the flood sensors 332, the seismic sensors 334, or the carbon monoxide sensors 335 may have three or more levels of notifications. For example, the sensors may have three levels of notification. The first level notification may be a normal notification, which may correspond to a gas or temperature within a normal working. The first level notification may not require the utility technician 353 to be dispatched or emergency services 360. The second level notification may be a warning notification, which may correspond to a safety breach not severe enough to trigger a dangerous event such as an explosion. The second level notification may require the utility technician 353 to be dispatched without notifying and/or requiring emergency services 360. The third level notification may be a shut-off notification, which may correspond to a safety breach severe enough to trigger a dangerous event such as an explosion. The third level notification may require both the utility technician 353 and emergency services 360 to be dispatched. It is to be understood that more levels of notifications may be implemented by the LCU 320.

Figure 4:
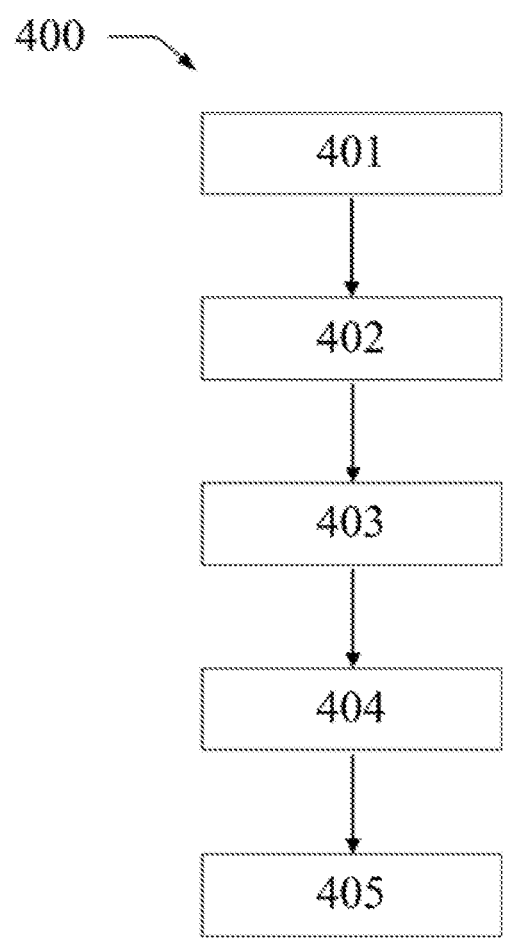
FIG. 4 is a flow chart illustrating a method of implementing a GSMMES of FIG. 3, according to an embodiment of the disclosure.

FIG. 4 illustrates a method 400 for implementing the GSMMES 300. In step 401, the heat sensor 331, the gas sensor 332, the flood sensor 333, the seismic sensor 334, or the carbon monoxide sensor 335 detects a failure and is then activated by the detected failure. Such failure may be an abnormal temperature, a natural gas leak, a flood, an earthquake, a carbon monoxide leak, et cetera. In the following step 402, the activated sensor may send a failure signal to the LCU 320. Next in step 403, the LCU 320 instructs a gas meter to shut off one or more of the shut-off valves 336, thus preventing additional gas or other utility fluids delivery to one or more failure areas or a determined perimeter located adjacent to the one or more failure areas in the structure 330 from the gas or fluid line 354 and/or the source 352. At the same time, the LCU 320 may further send a notification to a remote or on-site secure data center 310. Then in step 404, upon receiving the notification from the LCU 320, the data center 310 may be configured to immediately send a notification signal (e.g., via Ethernet, Internet, LAN/WLAN, ZigBee, Bluetooth, Wi-Fi, Cellular, Satellite, or other applicable means) to the utility company monitoring stations 351 and/or the home/business owner 340. Finally, in step 405, based on the received notification from the data center 310 and preset safety protocols, the utility technician 353 may be dispatched and/or the emergency services 360 may be notified.

Utility Safety Monitoring System (USMS)

In further embodiments, the disclosure provides a USMS which may include one or more hardware components such as natural gas sensors, temperature sensors, carbon monoxide sensor, flood sensors, seismic sensors, shut-off valves, proportional valves, smart valves, smart electricity meters, smoke sensors, local control units (LCU), Internet of Things (IOT) platform devices (e.g., a NodeMCU unit such as an ESP 8266 unit), valve control devices (e.g., a gas meter shut-off valve), backup battery power supply devices, firewall devices, Wi-Fi devices, and wireless/wired communication devices. Each of the natural gas sensors, temperature sensors, carbon monoxide sensor, flood sensors, seismic sensors, shut-off valves, proportional valves, smart valves, smart valves, smart electricity meters, smoke sensors, and valve control devices may be equipped with its own or shared IOT platform device. Alternatively, the USMS may further include one or more components such as monitoring control center (MCC), utility company monitoring stations, utility technician devices, homeowner devices, home appliances such as stove oven, boiler, hot water heater, et cetera. Part or all of the hardware components may be connected via Ethernet, Internet, LAN/WLAN, ZigBee, Bluetooth, Wi-Fi, Cellular, Satellite, or other applicable means.

The USMS may further include one or more software components such as MCC interface, software, mobile app, or Software as a Service (SAS); utility company monitoring & management interface, software, mobile app, or Software as a Service (SAS); utility company personnel monitoring & notifications interface, software, mobile app, or Software as a Service (SAS); and home/business owners interface, software, mobile app, or Software as a Service (SAS). The USMS may implement security protocols/methods in both internal and external communications such as encryption, Ethernet/Internet/LAN/WLAN/ZigBee/Bluetooth/Wi-Fi/Cellular/Satellite redundancy, Blockchain, or other centralized/decentralized protocols.

Figure 5:
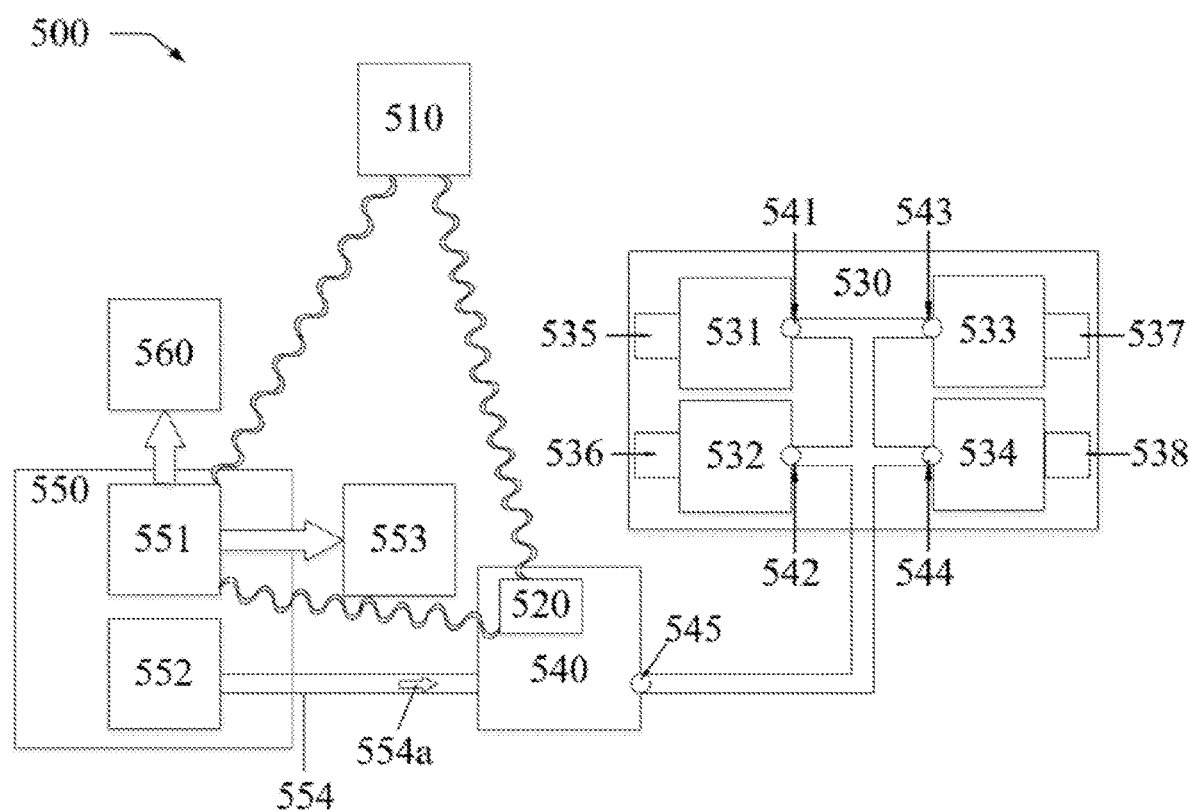
FIG. 5 is a diagram of a utility safety monitoring system (USMS) according to an embodiment of the disclosure.

FIG. 5 shows a utility safety monitoring system (USMS) according to an embodiment of the disclosure. As shown in FIG. 5, a USMS 500 may include a utility gas meter 540 with a local control unit (LCU) 520 and a shut-off valve 545. The LCU 520 may be installed inside, outside, or proximate to a home/business structure 530 or the utility gas meter 540, and the utility gas meter 540 may be installed inside, outside, or proximate to the home/business structure 530. The utility gas meter 540 may be connected to one or more street utility gas or fluid entries 554 from the utility company 550 and one or more appliances 531-534 in the home/business structure 530. The term appliance here may refer to a stove 531, an oven 532, a boiler 533, a hot water heater 534, a heater, or any other appliance (whether in a residential setting or not) that consumes utility gas or other utility fluids. Each of the home appliances may be equipped or coupled with a sensor in wireless or wired connection with the LCU 520 for detecting a failure or a malfunction of the corresponding home appliance. The connections may be partially or fully implemented by Ethernet, Internet, LAN/WLAN, ZigBee, Bluetooth, Wi-Fi, Cellular, Satellite, or other applicable means. Additionally, each of the home appliances may be further equipped with its own valve. In the non-limiting embodiment shown in FIG. 5, a sensor 535 and a valve 541 are coupled with the stove 531; a sensor 536 and a valve 542 are coupled with the oven 531; a sensor 537 and a valve 543 are coupled with the boiler 533; and a sensor 538 and a valve 544 are coupled with a hot water heater 534. Alternatively, or additionally, sensors 535-538 for detecting failures or events (e.g., earthquakes) and valves 541-544 may be placed in other locations. In some embodiments, sensors 535-538 and valves 541-544 are part of a home alarm system. The utility gas meter 540 as shown in FIG. 5 may be further configured to be in wired or wireless communication with a monitoring control center (MCC) 510 close to or remote from the utility gas meter 540. The MCC 510 may be further configured to be in wired or wireless communication with one or more local or remote utility companies providing the utility gas or other utility fluids.

In some embodiments, in the event of a safety breach, one or more of the sensors 535-538 detect the safety breach event, and instantly notify the LCU 520. Upon receiving the notification, the LCU 520 immediately initiates a command to one or more of the valves 541-545 to partially or fully terminate gas flow 554a coming into the structure 530 from the source 552 in the utility company 550 by gas line 554, thus preventing a further safety breach. At the same time, the LCU 520 sends a notification to the remote or on-site MCC 510 via Ethernet, Internet, LAN/WLAN, ZigBee, Bluetooth, Wi-Fi, Cellular, Satellite, or other applicable means. After receiving the notification from the LCU 520, the MCC 510 instantly notifies utility company monitoring stations 551.

Upon receiving the notification, the utility company 550 may further notify a utility technician 553 associated with the affected area and/or emergency services (police, fire, medical, et cetera) 560 according to preset safety protocols. The process may be carried out automatically with or without human intervention, and may occur within seconds of any dangerous natural gas leak, run-away boiler, flooding event, earthquake, carbon monoxide leak, et cetera.

For example, in the event of a gas leak without an explosion, the utility technician 553 associated with the affected area may be dispatched to fix the leak, and emergency services 560 may be notified without being requested. At the same time, the gas line 554 remains shut down until the dispatched technician 553 and/or the remote utility company 550 determine that the system is safe and reset the shut-off valve 536 according to utility company policies. While in some embodiments, the shut-off valve 536 may be reset remotely (e.g., by the utility company 550), it may be patentably desirable for the shut-off valve 536 to have to be reset manually on site. In the event of a leak with an explosion, the utility technician 553 may be dispatched to the affected area and emergency services 560 may be notified and requested.

In other embodiments, the sensors 535-538 may have more than one level of notifications. For example, the sensors may have two levels of notification. The first level notification may be a warning notification, which may correspond to a safety breach not severe enough to trigger a dangerous event such as an explosion. The first level notification may require the utility technician 553 to be dispatched without notifying and/or requiring emergency services 560. The second level notification may be a shut-off notification, which may correspond to a safety breach severe enough to trigger a dangerous event such as an explosion. The second level notification may require both the utility technician 553 and emergency services 560 to be dispatched.

In further embodiments, the sensors 535-538 may have three or more levels of notifications. For example, the sensors may have three levels of notification. The first level notification may be a normal notification, which may correspond to a normal condition. The first level notification may not require the utility technician 553 to be dispatched or emergency services 560. The second level notification may be a warning notification, which may correspond to a safety breach not severe enough to trigger a dangerous event such as an explosion. The second level notification may require the utility technician 553 to be dispatched without notifying and/or requiring emergency services 560. The third level notification may be a shut-off notification, which may correspond to a safety breach severe enough to trigger a dangerous event such as an explosion. The third level notification may require both the utility technician 553 and emergency services 560 to be dispatched. It is to be understood that more levels of notifications may be implemented by the LCU 520.

Figure 6:
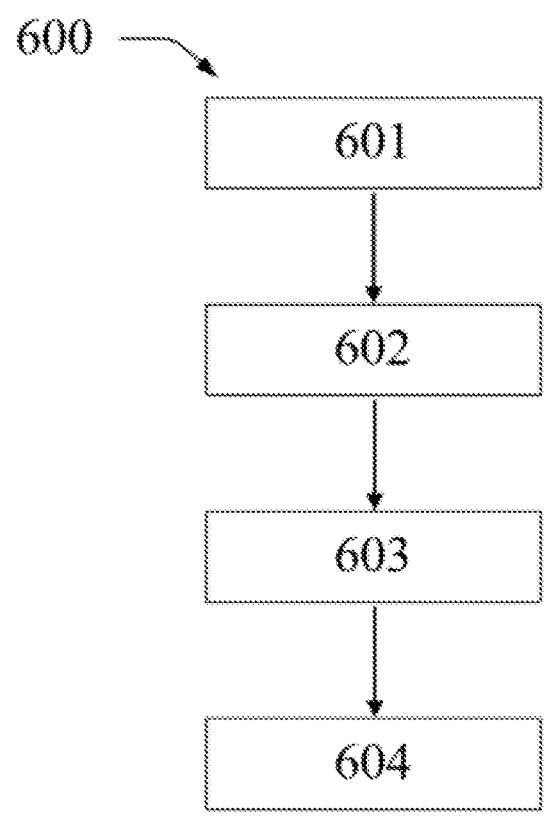
FIG. 6 is a flow chart illustrating a method of implementing a USMS of FIG. 5, according to an embodiment of the disclosure.

FIG. 6 illustrates a method 600 for implementing the USMS 500. In step 601, a respective sensor 535, 536, 537, 538 may detect a failure and is then activated by the detected failure. In the following step 602, the activated sensor may send a failure signal to the LCU 520 of the gas meter to shut off one or more of the shut-off valves 541, 542, 543, 544, 545, thus preventing delivery of additional gas (or other utility fluids) 554a by line 554 to one or more failure areas or a determined perimeter located adjacent to the one or more failure areas. In addition, the LCU 520 may be configured to immediately send a first notification signal (e.g., via Ethernet, Internet, LAN/WLAN, ZigBee, Bluetooth, Wi-Fi, Cellular, Satellite, or other applicable means) to the MCC 510, utility company 550, and/or local emergency services 560 upon receiving the failure signal sent by the activated sensor. In step 603, the MCC 510 may receive the first notification signal, and then immediately send a second notification signal to notify the utility company 550 of the failure and the shutdown. Lastly, in step 604, the utility company 550 verifies the received second notification signal and take actions according to protocols.

Locking Mechanism of Valves

In some embodiments of NGMES, GSMMES, and USMS, the shut-off valves may be installed inside, outside, or proximate to a LCU, a utility gas meter, or a home/business structure. One or more of the shut-off valves themselves may be designed and configured as the LCU. And the coded information may include, but not limited to: installation location, end-user id, end-user address, account number, system part id, system equipment id, phone number, address of installation, type of part or all of the sensors, and on-site installation location of part or all of the sensors. The LCU may further remotely or locally activate and respond to both the sensors and the utility company. The LCU may remotely or locally activate and respond to periodic equipment checks by the CDC or MCC.

Figure 7A:
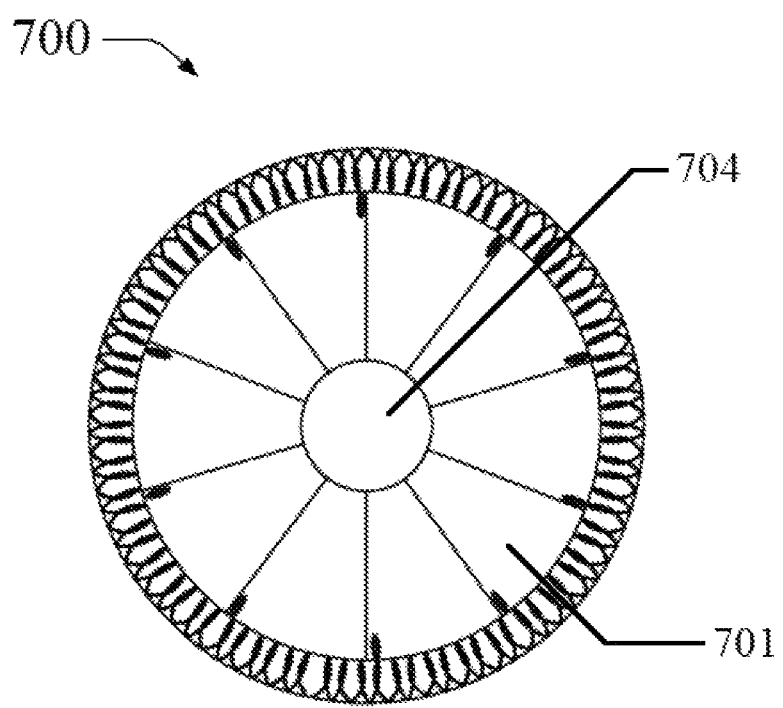
FIG. 7A is a top view of a locking mechanism of a shut-off valve according to an embodiment of the disclosure.
Figure 7B:
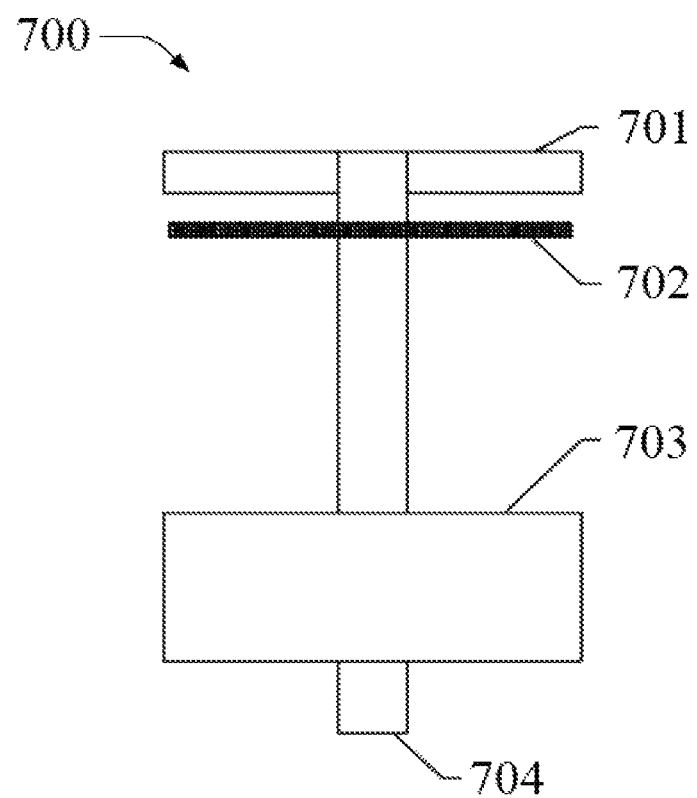
FIG. 7B is a side view of the locking mechanism of FIG. 7A.
Figure 8:
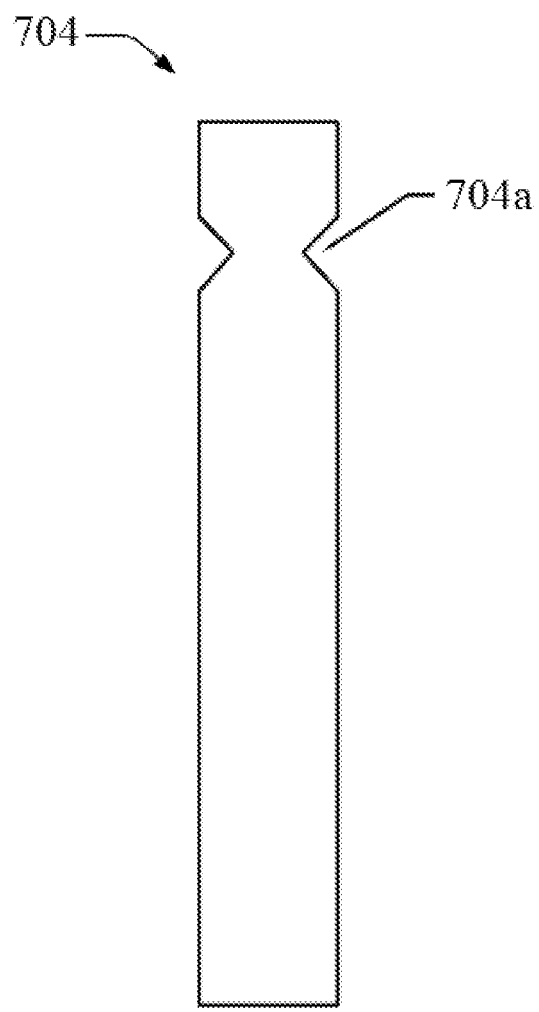
FIG. 8 is a side view of a shaft of the shut-off valve of FIG. 7, according to an embodiment of the disclosure.

In other embodiments of NGMES, GSMMES, and USMS, the disclosed system may be implemented using one or more shut-off valves with the locking mechanism as shown in FIGS. 7A-8. FIG. 7A is a top view of the locking mechanism 700, FIG. 7B is a side view of the locking mechanism 700, and FIG. 8 is a side view of a shaft 704 of a shut-off valve. As shown in FIGS. 7A-8, the locking mechanism 700 may include a diaphragm 701, a locking component 702, a magnetic solenoid 703, and the locking shaft 704. The shaft 704 of the shut-off valve may include a locking notch 704a marking a closed position. When the locking mechanism 700 is actuated to close the gas (or other fluid) flow, an electric charge or a control signal activates the magnetic solenoid 703 to extend the shaft 704 (in the direction of FIG. 7B, upwardly). This pushes the diaphragm 701 to block the gas (or other fluid) flow. At the same time, the locking component 702 is fixed to the locking notch 704a of the shaft 704. Further, the locking mechanism 700 may keep the shaft 704 in the closed position marked by the locking notch 704a and may optionally cease the electric charge or the signal. Once in the closed position, the shaft 704 may be reset to the previous open position by a human mechanical action, a control signal or command, or other non-electrical or electrical means. It may be patentably desirable that, once in a closed position, the shaft 704 of the shut-off valve may be reset to the previous open position only by a human mechanical action. While a locking mechanism of a solenoid diaphragm valve is shown here for illustration, a person of ordinary skill in the art would understand that similar locking mechanisms may be implemented by other types of valves such as a ball valve, a butterfly valve, a choke valve, a gate valve, a global valve, a knife valve, a needle valve, a pinch valve, a piston valve, a plug valve, a spool valve, et cetera. In those embodiments as well, it may be patentably desirable for a human mechanical action to be required to reset to from a closed position to an open position.

In further embodiments of NGMES, GSMMES, and USMS, various plumbing hardware, such as gas shut-off valves or gas meters with new design applications, may be incorporated into the disclosed system. These valves and meters may be redesigned or reconfigured to be controlled by solenoid switches that may be activated by a signal sent from one or more of the sensors. A direct or proportional shut off capability may be made available to the utility company, which may help to eliminate the need for a technician to go to the premise to shut off the flow of the utility gas or any other utility fluids. Once activated, the solenoid may actuate to close the valve. Optionally, the valve may have communication abilities and may be designed or configured to act as a LCU which may in turn communicate with a CDC or MCC.

Electricity Safety Management and Monitoring Emergency System (ESMMES)

In some embodiments, the disclosure provides an ESMMES which may include one or more hardware components such as electrical sensors, temperature sensors, surge sensor, flood sensors, seismic sensors, shut-off valves, proportional valves, smart valves, smart electricity meters, smoke sensors, local control units (LCU), Internet of Things (IOT) platform devices (e.g., a NodeMCU unit such as an ESP 8266 unit), valve control devices (e.g., an electrical shut-off), backup battery power supply devices, firewall devices, Wi-Fi devices, and wireless/wired communication devices. Each of the components may be equipped with its own or shared IOT platform device. Alternatively, the ESMMES may further include one or more components such as secure cloud data centers, utility company monitoring stations, utility technician devices, homeowner devices, et cetera. Part or all of the hardware components may be connected via Ethernet, Internet, LAN/WLAN, ZigBee, Bluetooth, Wi-Fi, Cellular, Satellite, or other applicable means.

The ESMMES may further include one or more software components such as ESMMES Cloud Based interface, software, mobile app, or Software as a Service (SAS); utility company monitoring & management interface, software, mobile app, or Software as a Service (SAS); utility company personnel monitoring & notifications interface, software, mobile app, or Software as a Service (SAS); and home/business owners interface, software, mobile app, or Software as a Service (SAS). The ESMMES may implement security protocols/methods in both internal and external communications such as encryption, Ethernet/Internet/LAN/WLAN/ZigBee/Bluetooth/Wi-Fi/Cellular/Satellite redundancy, Blockchain, or other centralized/decentralized protocols.

Figure 9:
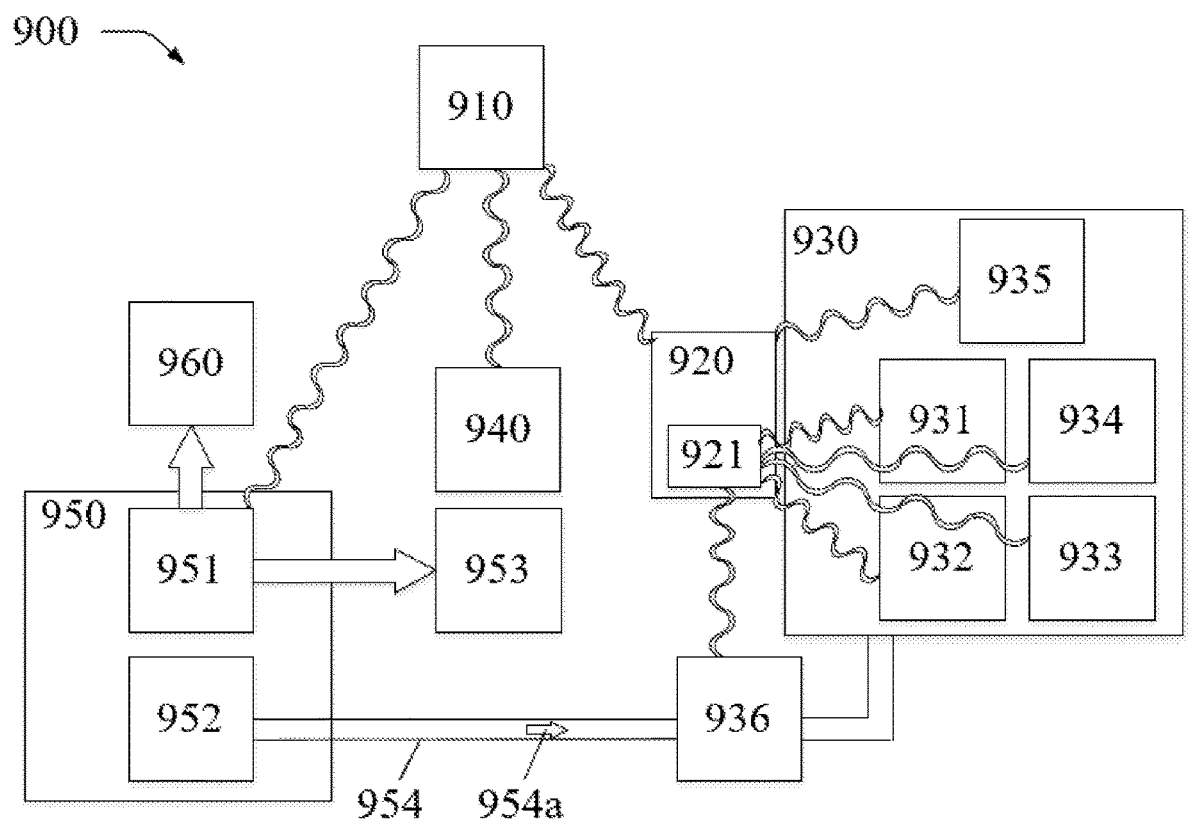
FIG. 9 is a diagram of an electricity safety management and monitoring emergency system (ESMMES) according to an embodiment of the disclosure

FIG. 9 shows an electricity safety management and monitoring emergency system (ESMMES) 900 according to an embodiment of the disclosure. As shown in FIG. 9, a Local Control Unit (LCU) 920 may include a Wi-Fi component 921, and may be installed inside, outside, or proximate to a home/business structure 930 or an electricity meter. The LCU 920 may monitor an ESMMES hardware component for a normal or dangerous parameter level by using heat sensors 931, electrical sensors 932, flood sensors 933, seismic sensors 934, and surge sensors 935. The LCU 920 may further monitor an operational system status, a connectivity status, electronic hardware status, electricity delivery status, et cetera. While FIG. 9 shows that the heat sensors 931, the electrical sensors 932, the flood sensors 933, and the seismic sensors 934 are connected to the Wi-Fi component 921 of the LCU 920 while surge sensors 935 are connected to the LCU 920 directly, a person of ordinary skilled in the art would understand that this embodiment only shows a non-limiting configuration of connection; in other connection configurations, one or more of the heat sensors 931, the electrical sensors 932, the flood sensors 933, the seismic sensors 934, and the surge sensors 935 may be wired or wirelessly connected to one or more components of the LCU 920.

In some embodiments, the heat sensor 931, the electrical sensor 932, the flood sensor 933, the seismic sensor 934, or the surge sensor 935 detects a dangerous event such as an abnormal temperature, a short circuit, a flood, an earthquake, or an electrical surge, and instantly notifies the LCU 920. Upon receiving the notification, the LCU 920 immediately initiates a command to an electricity meter switch 936 to partially or fully shut off electrical current 954a coming into the structure 930 from the electricity source 952 by power line 954. At the same time, the LCU 920 sends a notification to a remote or on-site data center 910 via Ethernet, Internet, LAN/WLAN, ZigBee, Bluetooth, Wi-Fi, Cellular, Satellite, or other applicable means. After receiving the notification from the LCU 920, the data center 910 instantly notifies utility company monitoring stations 951 and/or sends a notification (e.g., SMS message) to a home/business owner 940. This way, the data center 910 notifies both parties of the event—the utility company 950 and the owner 940. Upon receiving the notification, the utility company 950 may further notify a utility technician 953 associated with the affected area and/or emergency services (police, fire, medical, et cetera) 960 according to preset safety protocols. The process may be carried out automatically with or without human intervention, and may occur within seconds of any dangerous electrical event.

For example, in the event of a short circuit without an explosion, the utility technician 953 associated with the affected area may be dispatched to fix the issue, and emergency services 960 may be notified without being requested. At the same time, the power line 954 remains shut down until the dispatched technician 953 and/or the remote utility company 950 determine that the system is safe and reset the electricity meter switch 936 according to utility company policies. While in some embodiments, the electricity meter switch 936 may be reset remotely (e.g., by the utility company 950), it may be patentably desirable for the electricity meter switch 936 to have to be reset manually on site. In the event of an electrical event with an explosion, the utility technician 953 may be dispatched to the affected area and emergency services 960 may be notified and requested.

In other embodiments, the heat sensors 931, the electrical sensors 932, the flood sensors 933, the seismic sensors 934, or the surge sensors 935 may have more than one level of notifications. For example, the sensors may have two levels of notification. The first level notification may be a warning notification, which may correspond to a safety breach not severe enough to trigger a dangerous event such as an explosion. The first level notification may require the utility technician 953 to be dispatched without notifying and/or requiring emergency services 960. The second level notification may be a shut-off notification, which may correspond to a safety breach severe enough to trigger a dangerous event such as an explosion. The second level notification may require both the utility technician 953 and emergency services 960 to be dispatched.

In further embodiments, the heat sensors 931, the electrical sensors 932, the flood sensors 933, the seismic sensors 934, or the surge sensors 935 may have three or more levels of notifications. For example, the sensors may have three levels of notification. The first level notification may be a normal notification, which may correspond to a normal working condition. The first level notification may not require the utility technician 953 to be dispatched or emergency services 960. The second level notification may be a warning notification, which may correspond to a safety breach not severe enough to trigger a dangerous event such as an explosion. The second level notification may require the utility technician 953 to be dispatched without notifying and/or requiring emergency services 960. The third level notification may be a shut-off notification, which may correspond to a safety breach severe enough to trigger a dangerous event such as an explosion. The third level notification may require both the utility technician 953 and emergency services 960 to be dispatched. It is to be understood that more levels of notifications may be implemented by the LCU 920.

Figure 10:
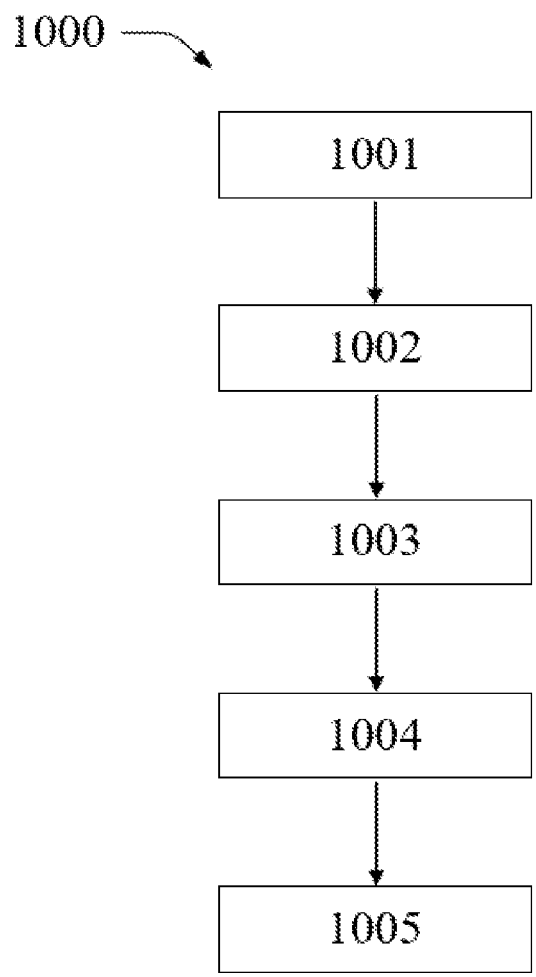
FIG. 10 is a flow chart illustrating a method of implementing an ESMMES of FIG. 9, according to an embodiment of the disclosure.

FIG. 10 illustrates a method 1000 for implementing the ESMMES 900. In step 1001, the heat sensor 931, the electrical sensor 932, the flood sensor 933, the seismic sensor 934, or the surge sensor 935 detects a failure and is then activated by the detected failure. Such failure may be an abnormal temperature, a short circuit, a flood, an earthquake, an electrical surge, et cetera. In the following step 1002, the activated sensor may send a failure signal to the LCU 920. Next in step 1003, the LCU 920 instructs a smart electricity meter to shut off one or more of the electricity meter switches 936, thus preventing additional electricity delivery to one or more failure areas or a determined perimeter located adjacent to the one or more failure areas in the structure 930 from the power line 954 and/or the electricity source 952. At the same time, the LCU 920 may further send a notification to a remote or on-site secure data center 910. Then in step 1004, upon receiving the notification from the LCU 920, the data center 910 may be configured to immediately send a notification signal (e.g., via Ethernet, Internet, LAN/WLAN, ZigBee, Bluetooth, Wi-Fi, Cellular, Satellite, or other applicable means) to the utility company monitoring stations 951 and/or the home/business owner 940. Finally, in step 1005, based on the received notification from the data center 910 and preset safety protocols, the utility technician 953 may be dispatched and/or the emergency services 960 may be notified.

Some Non-Limiting Functions of NGMES, GSMMES, USMS, and ESMMES

In some embodiments, the LCU may be attached to a shut-off valve, a utility gas meter, or a home/business structure, and may be activated to perform the emergency shut down of one or more shut-off valves while simultaneously initiating wired or wireless communications between itself and the CDC or MCC. The LCU may act as part of one or more of the shut-off valves and may be configured to immediately notify the CDC or MCC upon the detection of one or more failures of home appliances.

In other embodiments, the CDC or MCC may be configured or programmed to continuously monitor, canvas, control, or communicate with part or all of units of the NGMES, GSMMES, USMS, or ESMMES. And the CDC or MCC may be further configured or programmed to communicate with the utility company and report the working status and information of the disclosed system to one or more local or remote utility companies. In case of an emergency or the detection of a failure, the CDC or MCC may receive one or more failure notifications from one or more sensors coupled with one or more home appliances, and report the received failure notifications to one or more local or remote utility companies. Alternatively, the CDC or MCC may periodically check or canvas the installations or system parts with regards to their working communication status. And any failure may immediately trigger a notification to the CDC or MCC. Upon receiving such notification, the CDC or MCC may immediately notify the responsible utility company or entities. After receiving the CDC or MCC notification, the utility company or entities may validate the receipt of notification with a confirmation response back to the CDC or MCC to complete a notification cycle.

In further embodiments, a communication system may be designed and dedicated to servicing utilities by providing real time information as to the status of deliverable product and equipment operation via Ethernet, Internet, LAN/WLAN, ZigBee, Bluetooth, Wi-Fi, Cellular, Satellite, or other applicable means. Additionally, onsite or remote computer hardware and software may be used to monitor and communicate with each location on an individual or an integral basis. The wired or wireless communications may be configured or programmed to continuously monitor, canvas, control, or communicate with part or all of units of the NGMES, GSMMES, USMS, or ESMMES on a regular and frequent basis.

In still further embodiments, the one or more sensors may be one or more electrical transducers for detecting, for example, one or more of water, heat, stream, natural gas, propane, butane, gasoline, synthesis gas, marsh gas, carbon monoxide, gasoline, diesel, other utility fluids, electrical surge, earthquake, flood, or other electrical or non-electrical signals. The sensors may be located inside, outside, or proximate to a home appliance, a LCU, a utility gas meter, or a home/business structure in particular positions or premises of the NGMES, GSMMES, USMS, or ESMMES so that they may be both close to the corresponding home appliances and in wired or wireless communication with the LCU.

The sensors may be configured to react to unsafe conditions and/or trigger a series of communications that may act to prevent the delivery of additional product (utility gas fuel), other utility fluids, or electricity to the fault item and surrounding items. The sensors may be further configured to detect at minimum unsafe levels of gas, excessive levels of heat that is associated with gas burners and/or machinery, an unsafe operation of equipment, or fire. In addition, the sensors may send signals to the LCU which may be activated to shut off one or more of the shut-off valves or smart electricity meter switches, thus preventing additional gas, other utility fluids, or electricity delivery to one or more failure areas and a determined perimeter located adjacent to the one or more failure areas. The failure areas and the determined perimeter located adjacent to one or more failure areas may be defined by one or more working home appliances, one or more failed home appliance, one or more sensors, one or more utility meters with LCU, one or more CDC or MCC, one or more designated local positions or locations, or one or more remote designated positions or locations. Further, the sensors may be of specific use or multi-function design, meaning that they may be able to detect one or more of water, heat, stream, natural gas, propane, butane, gasoline, synthesis gas, marsh gas, carbon monoxide, gasoline, diesel, other utility fluids, electrical surge, earthquake, flood, or other electrical or non-electrical signals. Further still, the sensors may be configured or programmed to have wired or wireless communication capabilities.

In some embodiments of the disclosure, the NGMES, GSMMES, USMS, or ESMMES may be configured individually or in combinations to perform tasks including, but not limited to: (1) recognizing all equipment locations and canvas each location assuring continual communication capabilities; (2) reacting to recognized unsafe and/or failure situations detected by one or more of the sensors; (3) automatically triggering one or more of the shut-off or proportional valves and starting the communication loop beginning with the LCU to the CDC or MCC; and (4) routing the emergency information to the appropriate utility company or entities so they may respond in a timely manner. Some or all equipment of the system may have wired or wireless transmission capabilities, and some or all equipment may also have wired or wireless receiving capabilities. Each individual sensor may be coded or programed with an identification which may incorporate information such as installation location, end-user id, end-user address, account number, system part id, system equipment id, phone number, address of installation, type of part or all of the sensors, or on-site installation location of part or all of the sensors. This coded identification information may be further programmed into the LCU.

It is to be understood that part or all of the components in the disclosed NGMES, GSMMES, USMS, or ESMMES may be designed or configured to be powered by batteries, electrical current from an electrical grid, or both. Optionally, specialized interactive grid maps or other user interfaces may be utilized by the MCC, CDC, utility company monitoring stations, utility technician devices, homeowner devices, or business owner devices in implementing the systems and methods set forth herein.

It is to be further understood that while the utility gas is illustrated in some non-limiting exemplary embodiments as shown in FIGS. 1-8, the disclosed NGMES, GSMMES, USMS, or ESMMES may be implemented in other embodiments which involve using electricity or other utility fluids such as water, steam, natural gas, propane, butane, gasoline, synthesis gas, marsh gas, carbon monoxide, gasoline, diesel, et cetera.

Various embodiments of the disclosure may provide a device, a method, or a system having one or more of the following effects.

In some embodiments, the disclosure may, for example, be implemented by utility companies, which may, out of many potentially beneficial effects, reduce the frequency of disastrous events or promote public relations by publicizing the USMS. Alternatively, the disclosure may be implemented by residential, commercial, or industrial customers, which may help to ensure a universally safer utility fluid or electricity delivery system.

In other embodiments, the disclosure may achieve potentially beneficial effects including, but not limited to: saving lives of residential, commercial, or industrial customers; reducing the costs of lost product and/or the damage caused by a catastrophic event; reducing the accumulation of utility gas; reducing the accumulation of other utility fluids such as water, steam, natural gas, propane, butane, gasoline, synthesis gas, marsh gas, carbon monoxide, gasoline, diesel, et cetera; mitigating the need for repair or maintenance work; saving man hours for utility companies; enabling the utility company to remotely monitor or control local valves, local meters, or local control units; reducing the possibility of unauthorized access; and enabling part or all of valve closures to be operated by manual operations with specific application tools.

In further embodiments, the disclosure may provide an NGMES, GSMMES, USMS, or ESMMES, which may monitor levels of gas and/or automatically terminate the gas supply at the meter before levels of gas become dangerous. The disclosed system may notify utility company monitoring station computers of the details of the event immediately on one or more of the system displays. Notification may be followed up immediately with one of more of instant SMS messages to a home/business owner. The system may also notify local emergency services, and home/business owners that their gas supply has been terminated for safety reasons due to faults within their building structure.

In some embodiments, the disclosure may provide an NGMES, GSMMES, USMS, or ESMMES, which may be configured monitor and/or manage any grid size configuration of gas distribution infrastructure that exists. In other words, the disclosed system may have the capability to establish controllable grids that may be managed in large numbers on a city or state level, and/or also be sub-divided into sub-girds all the way down to a micro level of single units in a home/residential structure. For example, in the event of a safety breach at one house, the utility company may shut down the gas supply to that affected house and send out safety warning notifications to houses near the affected house. In the event of a huge safety breach in an area, the utility company may remotely shut down larger areas such as local streets and city blocks. The disclosed system may also monitor temperature levels rising due to fire, runaway boiler, or any other appliance capable of causing increased temperature levels. Sensors in the disclosed system may monitor flood conditions or earthquake events. Under dangerous temperature levels, flooding conditions, or earthquake events, the system may automatically shut off the gas supply at individual or multiple locations.

In other embodiments, the disclosed system may achieve potentially beneficial effects including, but not limited to: measuring gas levels at a stove/other appliances; measuring temperature levels at a boiler; remotely terminating gas flows at utility gas meters; checking and providing proof of closure; saving lives; locally detecting dangerous levels of gas or high temperatures and remotely terminating the gas supply at the meter within seconds; immediately notifying the utility company, home/business owner, and emergency services of the event, successful termination, and current status; promoting the public relationship and marketing efforts of the utility company; reducing the cost of internal labor force, property damage, insurance charge, and system upgrade of the utility company; utilizing Ethernet, Internet, LAN/WLAN, ZigBee, Bluetooth, Wi-Fi, Cellular, Satellite, or other applicable means to connect part or all of the components in the system; implementing an SAS (software as a solution) with no costly software installation, personalized customization meeting internal requirements, flexibility for future feature sets and growth, and managed system updated; self-monitoring connectivity status, electronic hardware status, and electricity delivery status; and powering part of all components of the system by batteries, electrical current from an electrical grid, or both.

Many different arrangements of the various components depicted, as well as components not shown, are possible without departing from the spirit and scope of the disclosure. Embodiments of the disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A gas safety management and monitoring emergency system, comprising:
    a gas meter;
    a local control unit;
    a home appliance with a failure sensor;
    a cloud data center; and
    a shut-off valve;
    wherein:
        the failure sensor is coupled with a NodeMCU unit;
        the gas meter is connected to a utility gas entry and the home appliance by gas lines;
        the failure sensor is activated to send a failure signal to the local control unit upon detecting a failure event of the home appliance;
        the local control unit shuts down the shut-off valve and sends a first notification signal to the cloud data center upon receiving the failure signal from the failure sensor; and
        the cloud data center sends a second notification signal to a remote utility company upon receiving the first notification signal sent from the local control unit; and
        the shut-off valve utilizes a locking mechanism comprising a diaphragm, a locking component, a magnetic solenoid, and a locking shaft with a locking notch indicating a closed position, the locking shaft being received into the locking notch when the shut-off valve is in the closed position.

2. The system in claim 1, wherein the home appliance is selected from the group consisting of a stove, an oven, a boiler, and a hot water heater.

3. The system in claim 1, wherein the magnetic solenoid is actuated to extend the locking shaft and push the diaphragm to block passage of the utility gas when the shut-off valve is in the closed position.

4. The system in claim 3, wherein the closed position is maintained by fixing the locking component to the locking notch of the locking shaft.

5. The system in claim 3, wherein the locking shaft in the closed position is reset to an open position only by a human mechanical action.

6. The system in claim 1, wherein the failure sensor is selected from the group consisting of a carbon monoxide sensor, a heat sensor, a flood sensor, a gas sensor, and a seismic sensor.

7. The system in claim 1, wherein the NodeMCU unit is an ESP 8266 microchip.

8. The system in claim 1, wherein the failure signal, the first notification signal, and the second notification signal are sent via Ethernet, Internet, LAN/WLAN, ZigBee, Bluetooth, Wi-Fi, Cellular, or Satellite.

9. The system in claim 8, wherein the failure signal, the first notification signal, and the second notification signal are encrypted.

10. The system in claim 1, wherein the failure event of the home appliance is selected from the group consisting of an equipment failure, a utility gas leak, a temperature outside a normal range, a carbon monoxide leak, a flooding condition, and an earthquake.

11. A utility safety monitoring system, comprising:
a utility fluid meter coupled with a home or business structure;
a local control unit;
a home appliance with a failure sensor;
a monitoring control center; and
a shut-off valve;
wherein:
   the failure sensor is coupled with a NodeMCU unit;
   the utility fluid meter is connected to a utility fluid entry and the home appliance by utility fluid lines;
   the failure sensor is activated to send a failure signal to the local control unit upon detecting a failure event of the home appliance;
   the local control unit shuts down the shut-off valve and sends a first notification signal to the monitoring control center upon receiving the failure signal from the failure sensor; and
   the monitoring control center sends a second notification signal to a remote utility company and a third notification signal to an owner of the home or business structure upon receiving the first notification signal sent from the local control unit; and
   the shut-off valve utilizes a locking mechanism comprising a diaphragm, a locking component, a magnetic solenoid, and a locking shaft with a locking notch indicating a closed position, the locking shaft being received into the locking notch when the shut-off valve is in the closed position.

12. The system in claim 11, wherein the home appliance is selected from the group consisting of a stove, an oven, a boiler, and a hot water heater.

13. The system in claim 11, wherein:
   the magnetic solenoid is actuated to extend the locking shaft and push the diaphragm to block passage of the utility fluid when the shut-off valve is in the closed position;
   and
   the locking shaft in the closed position is reset to an open position only by a human mechanical action.

14. The system in claim 11, wherein the failure sensor is selected from the group consisting of a carbon monoxide sensor, a heat sensor, a flood sensor, a gas sensor, and a seismic sensor.

15. The system in claim 11, wherein the NodeMCU unit is an ESP 8266 microchip.

16. The system in claim 11, wherein the failure signal, the first notification signal, and the second notification signal are encrypted, sent, and received via Ethernet, Internet, LAN/WLAN, ZigBee, Bluetooth, Wi-Fi, Cellular, or Satellite.

17. The system in claim 11, wherein the failure event of the home appliance is selected from the group consisting of an equipment failure, a utility fluid leak, a temperature outside a normal range, a carbon monoxide leak, a flooding condition, and an earthquake.

* * * * *